(12) United States Patent
Hautvast et al.

(10) Patent No.: US 8,873,817 B2
(45) Date of Patent: Oct. 28, 2014

(54) PROCESSING AN IMAGE DATASET BASED ON CLINICALLY CATEGORIZED POPULATIONS

(75) Inventors: Guillaume Leopold Theodorus Frederik Hautvast, Eindhoven (NL); Amedeo Chiribiri, Eindhoven (NL); Eike Caspar Cornelius Nagel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 190 days.

(21) Appl. No.: 13/517,253

(22) PCT Filed: Dec. 14, 2010

(86) PCT No.: PCT/IB2010/055794
§ 371 (c)(1),
(2), (4) Date: Jun. 20, 2012

(87) PCT Pub. No.: WO2011/077315
PCT Pub. Date: Jun. 30, 2011

(65) Prior Publication Data
US 2012/0269413 A1 Oct. 25, 2012

(30) Foreign Application Priority Data
Dec. 21, 2009 (EP) .................................. 09180146

(51) Int. Cl.
*G06K 9/00* (2006.01)
*G06T 11/20* (2006.01)
(52) U.S. Cl.
CPC ..... *G06T 11/206* (2013.01); *G06T 2207/30004* (2013.01); *G06T 2207/20004* (2013.01); *G06T 2210/41* (2013.01)
USPC ............................ 382/128; 382/131; 382/181

(58) Field of Classification Search
USPC .................................................. 382/128, 131
See application file for complete search history.

(56) References Cited

U.S. PATENT DOCUMENTS 7,532,214 B2 * 5/2009 Lundstrom .................... 345/424
7,830,381 B2 * 11/2010 Lundstrom et al. ........... 345/428
(Continued)

FOREIGN PATENT DOCUMENTS

WO 2009031135 A2 3/2009

OTHER PUBLICATIONS

Penzkofer H, Wintersperger BJ, Knez A, Weber J, and Reiser M, "Assessment of myocardial perfusion using multisection first-pass MRI and color-coded parameter maps: a comparison to 99mTc Sesta MIBI SPECT and systolic myocardial wall thickening analysis," Magn Reson Imaging. Feb. 1999;17(2):161-70.*

(Continued)

*Primary Examiner* — Utpal Shah

(57) ABSTRACT

A system for generating a processed image dataset is disclosed. The system comprises a plurality of parameter datasets (15), wherein a parameter dataset (1) corresponds to a clinically categorized population and represents a transfer function. The system further comprises a selector (2) for selecting a parameter dataset (1) from the plurality of parameter datasets (15). The system further comprises an image processing subsystem (3) for applying the transfer function represented by the selected parameter dataset (1) to at least part of an image dataset (4) specific for a patient, to obtain a processed image dataset (5). The selector (2) comprises a user interface element (6) for enabling a user to select the parameter dataset (1) from the plurality of parameter datasets (15). A parameter dataset (1) is based on a statistical distribution of a population characteristic.

20 Claims, 3 Drawing Sheets

(56) References Cited

U.S. PATENT DOCUMENTS

| | | | |
|---|---|---|---|
| 7,912,528 B2* | 3/2011 | Krishnan et al. | 600/407 |
| 2002/0183606 A1 | 12/2002 | Bochler et al. | |
| 2004/0259065 A1 | 12/2004 | Geiger | |
| 2006/0045328 A1 | 3/2006 | Jacob et al. | |
| 2006/0133658 A1 | 6/2006 | Spahn | |
| 2006/0241412 A1 | 10/2006 | Rinck et al. | |
| 2009/0138279 A1 | 5/2009 | Avinash et al. | |
| 2013/0102897 A1* | 4/2013 | Kalafut et al. | 600/431 |

OTHER PUBLICATIONS

M. Alper Selver, Felix Fischer, Mehmet Kuntalp, and Walter Hillen. 2007. "A software tool for interactive generation, representation, and systematical storage of transfer functions for 3D medical images." Comput. Methods Prog. Biomed. 86, 3 (Jun. 2007), 270-280.*

Michael Burns, Martin Haidacher, Wolfgang Wein, Ivan Viola, and Eduard Groeller. Feature Emphasis and Contextual Cutaways for Multimodal Medical Visualization. Eurographics / IEEE VGTC Symposium on Visualization 2007, pp. 275-282, May 2007.*

Bernhard Reitinger and Christopher Zach and Alexander Bornik and Reinhard Beichel, "User-Centric Transfer Function Specification in Augmented Reality," In Proc. of WSCG Plzen, Czech Republic, Feb. 2004, p. 355-362.*

Fang et al "Image-Based Transfer Function Design for Data Exploration", Proceedings of the IEEE Visualization, 1998, 8 Pages.

Machilsen et al, "Linear Normalization of MR Brain Images in Pediatric Patients With Periventricular Leukomalacia", Neuroimage, vol. 35, 2007, pp. 686-697.

Finnis et al, "Three-Dimensional Database of Subcortical Electrophysiology for Image-Guided Stereotactic Functional Neurosurgery", IEEE Transactions on Medical Imaging, vol. 22, No. 1, Jan. 2003, pp. 93-104.

* cited by examiner

PROCESSING AN IMAGE DATASET BASED ON CLINICALLY CATEGORIZED POPULATIONS

FIELD OF THE INVENTION

The invention relates to generating a processed image dataset. The invention further relates to overlaying an image dataset over an anatomical dataset.

BACKGROUND OF THE INVENTION

Images obtained using cardiac MRI may be the subject of quantitative analysis. Such quantitative analysis may be used to assess myocardial function, perfusion, or viability. Such quantitative analysis may result in a large amount of additional data, which may include measurements that may be different for different portions of the myocardium. Such spatially varying measurements are known to be visualized by means of a bull's eye plot. In such a bull's eye plot, measurement values are color coded and projected onto a plane comprising concentric circles each substantially corresponding to a strip of the myocardium in between two planes perpendicular to the long axis of the heart. Examples of bull's eye plots are shown in FIGS. 3A and 3B.

US 2006/0241412 A1 discloses a method of visualizing damage in the myocardium on the basis of CT image data which were recorded with injection of contrast medium. For the image recording, a time is chosen at which contrast enhancement occurs in the myocardium as a result of the first rapid circulation of the injected contrast medium. The myocardium is then isolated by segmentation in the CT image data. The myocardium is displayed on an image display device, isolated into one or more predefined views. The display is in color, with different color codings of voxels and pixels, attributable to CT density values in different density ranges.

SUMMARY OF THE INVENTION

It would be advantageous to have an improved processed image dataset. To better address this concern, a first aspect of the invention provides a system for generating a processed image dataset, comprising a plurality of parameter datasets, wherein a parameter dataset corresponds to a clinically categorized population and represents a transfer function;

a selector for selecting a parameter dataset from the plurality of parameter datasets; and an image processing subsystem for applying the transfer function represented by the selected parameter dataset to at least part of an image dataset specific for a patient, to obtain a processed image dataset.

Because of the transfer function represented by a parameter dataset corresponding to a clinically categorized population, the processed image dataset is adapted to the clinically categorized population. The selector allows selecting a desired parameter dataset, and thus it becomes possible to process the image in different ways depending on the population the patient is a member of or with which the patient is to be compared.

The selector may comprise a user interface element for enabling a user to select the parameter dataset from the plurality of parameter datasets. This way, the user has flexibility to choose which population to use.

One or more or all of the parameter datasets may be based on a statistical distribution of a population characteristic. Such a statistical distribution is an effective option for creating and selecting a useful parameter dataset.

The transfer function represented by the parameter dataset may be arranged for enhancing image values which are less commonly found in the population. This may help to identify spots having a problem.

The system may comprise a visualization subsystem for visualizing the processed image dataset. This makes it easy for a user to assess the processed image dataset.

The visualization subsystem may comprise an overlay subsystem for overlaying the processed image dataset over an anatomical image. This allows viewing the processed image in the context of the anatomy to which it relates.

The system may comprise an image combiner for combining anatomical features represented by any of a plurality of input anatomical images of the patient, to obtain a combined anatomical image, and wherein the overlay subsystem is arranged for overlaying the processed image dataset over the combined anatomical image. Sometimes different parts of the anatomy may be visible in different ones of a plurality of input anatomical images. By combining the anatomical features represented by different ones of the plurality of input anatomical images, a combined anatomical image is formed which comprises more details of the anatomy than any single input anatomical image. By overlaying the processed image over the combined anatomical image, a better anatomical context is provided for the information present in the processed image.

The transfer function may represent a color coding or an intensity scaling. Such a transfer function may result in a processed image which is easy to assess by visual inspection.

Another aspect of the invention provides a medical image acquisition apparatus comprising a system set forth, and further comprising an image scanner for acquiring the image dataset, the anatomical image, or at least one of the input anatomical images, respectively. This allows to acquire one or more of the images which the system can process.

Another aspect of the invention provides a medical workstation comprising a system set forth and a display connected to the visualization subsystem for displaying a visualization of the processed image dataset. This provides a convenient workstation which allows to inspect the processed image.

Another aspect of the invention provides a method of generating a processed image dataset, comprising selecting a parameter dataset of a plurality of parameter datasets, wherein a parameter dataset corresponds to a clinically categorized population and represents a transfer function; and applying the transfer function represented by the selected parameter dataset to at least part of an image dataset specific for a patient, to obtain a processed image dataset.

Another aspect of the invention provides a computer program product comprising instructions for causing a processor system to perform the method set forth.

It will be appreciated by those skilled in the art that two or more of the abovementioned embodiments, implementations, and/or aspects of the invention may be combined in any way deemed useful.

Modifications and variations of the image acquisition apparatus, the workstation, the system, and/or the computer program product, which correspond to the described modifications and variations of the system, can be carried out by a person skilled in the art on the basis of the present description.

A person skilled in the art will appreciate that the method may be applied to multi-dimensional image data, e.g. two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

In this description, techniques are described which can be used, among other things, in the area of visualization of analysis results derived from medical images. For example, images of the diseased heart acquired with cardiac magnetic resonance imaging (MRI) may be visualized using techniques described herein. However, this is not a limitation. Other kinds of images may also be processed, in particular images acquired using different imaging modalities, and/or images of other body parts.

Cardiovascular diseases are the most frequently occurring causes of death. Diagnosis of cardiac disease can be performed using Cardiac MRI. During a cardiac MRI exam, images are acquired using several protocols in order to assess several aspects of the state of the heart. These aspects may include myocardial function, perfusion, and viability. A quantitative assessment of such images results, among others, in a number of measurements for different positions on the myocardium. Clear and standardized visualizations of such results are important for correct diagnosis and treatment planning of cardiac disease. For example, known bull's eye plots may be used to visualize measurements which are variable with respect to the location on the myocardium. In such a bull's eye plot, different portions of the myocardium are mapped to different portions of the bull's eye plot in a standardized way. Each portion of the bull's eye plot is assigned a color depending on the corresponding measurement value.

Figure 1:
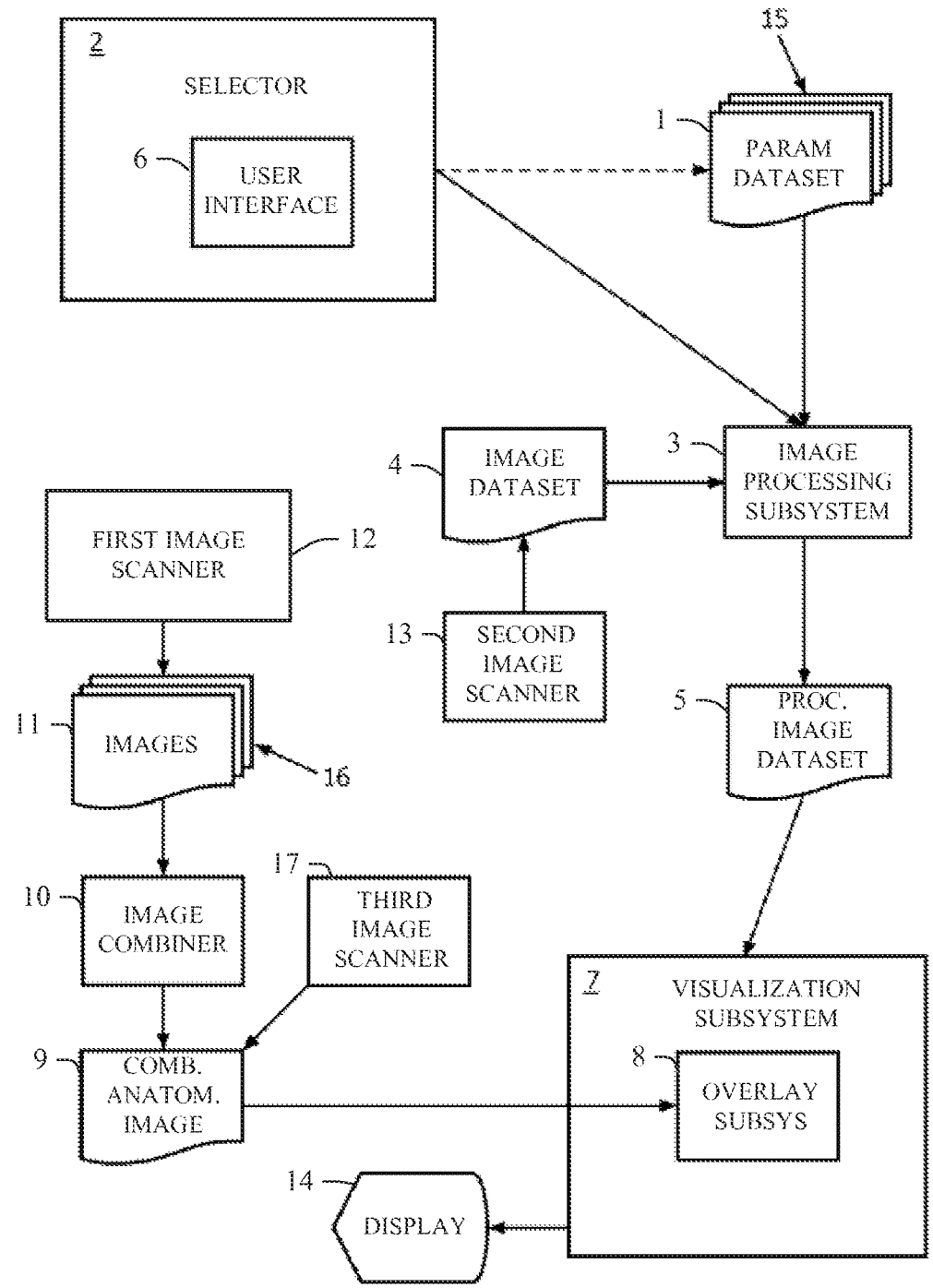
FIG. 1 is a diagram of a system for generating a processed image dataset.

FIG. 1 illustrates a system for generating a processed image dataset. At least part of the system may be implemented by means of a suitably programmed processor. To this end, a storage medium may be provided carrying a computer program product. However, other implementations are also possible, for example using a dedicated electric circuit. The system may comprise appropriate inputs and/or outputs, for example a communications port, for receiving input and transmitting output, for example via a network connection. Elements received and/or transmitted may comprise the different images processed and/or generated by the system, as well as control signals for operating the system. Data may also be exchanged by means of a removable storage medium.

The system may comprise a plurality of parameter datasets 15. A parameter dataset 1 of the plurality 15 corresponds to a clinically categorized population and represents a transfer function. For example, different parameter datasets correspond to different clinically categorized populations. The transfer function may be defined by the parameter dataset by means of one or more function parameters, such as a window/level setting, a color coding, or a look-up table. This way, different transfer functions are associated with different clinically categorized populations.

The system may further comprise a selector 2 for selecting a parameter dataset 1 from the plurality of parameter datasets 15. The selector may be arranged to select a parameter dataset 1, based on information about the patient which may be available from an electronic patient record, for example, or based on metadata which may be available in an image dataset 4 of the patient. For example, this information may enable the selector 2 to automatically determine a clinical category to which the imaged patient belongs. Subsequently, the selector 2 may be arranged to select the parameter dataset 1 which corresponds to the population of this clinical category.

The system may further comprise an image processing subsystem 3 for applying the transfer function represented by the selected parameter dataset 1 to at least part of an image dataset 4 specific for a patient, to obtain a processed image dataset 5. The image dataset 4 may comprise a two-dimensional or three-dimensional image with image elements having measured values relating to locations within the patient. The image may comprise functional values, for example myocardial perfusion or wall thickness. The image dataset 4 may be acquired by means of an image scanner 13, for example a CT scanner, an MRI scanner, or a PET or SPECT scanner. Other imaging modalities may also be used. An image processing module (not shown) may be present to process the data acquired from the image scanner 13 to obtain the image dataset 4.

The selector 2 may comprise a user interface element 6 for enabling a user to select the parameter dataset 1 from the plurality of parameter datasets 15. The user interface element 6 may be part of a user interface (not shown), which may enable a user to control viewing operations and/or image acquisition operations. The system may be arranged to allow the user to select different parameter datasets 1 for the same image dataset 4 and compare the different visualization results.

The parameter datasets 15 may be based on a statistical distribution of a population characteristic. For example, the parameter dataset 1 may comprise a mean and variance of the characteristic measured in a population. In one example of transfer functions used, the transfer function may be derived from the parameter dataset 1 by defining a transfer function having a level based on the mean and a width based on the variance.

The transfer function represented by the parameter dataset 1 may be arranged for enhancing image values which are less commonly found in the population. For example, values which are commonly found in the population may be given like colors, whereas values which are not commonly found (for example in less than 5% of the cases), may be given an easily recognizable color or intensity. The transfer function may represent a color coding or an intensity scaling.

The system may comprise a visualization subsystem 7 for visualizing the processed image dataset 5. For example, a piece of software code may be provided which may control a graphics card connected to a display device. Because of the transfer function applied to obtain the processed volume, the visualization is adapted to the selected population.

The visualization subsystem 7 may comprise an overlay subsystem 8 for overlaying the processed image dataset 5 over an anatomical image 9. For example, the anatomical image may be displayed in black-and-white, whereas the overlay may be displayed in color, on top of the anatomical image. For example, the processed image dataset 5 may relate to a limited portion of the body, such as the myocardium, whereas the anatomical image may provide information of a larger portion of the body, and provide the anatomical context of the processed image dataset.

The anatomical image 9 may be acquired by an image scanner 17. This image scanner 17 may be a computed tomography (CT) scanner, for example, or a magnetic resonance imaging (MRI) scanner. Alternatively, the system may comprise an image combiner 10 for combining anatomical features represented by any of a plurality of input anatomical images 16 of the patient, to obtain a combined anatomical image 9. The overlay subsystem 8 may be arranged for overlaying the processed image dataset 5 over the combined anatomical image 9. The plurality of input anatomical images 16 may comprise an image sequence acquired on a patient, for example an image series in which a bolus of contrast agent passes through an organ, such as the heart. By combining feature information from the sequence of images, the shape of the heart cavities may be established more completely than from any single image in the acquired image sequence. Other examples of combining information from a plurality of input anatomical images are given elsewhere in this description. The plurality of input images 16 may be acquired as an image series by means of a CT scanner or MRI scanner, for example.

The image dataset 4 and the anatomical image 9 may comprise images from a single image scan. These images may also be the result of two different image scans acquired with the same image scanner. Alternatively, these images may be acquired with two different image scanners 13, 17. Similarly, the image dataset 4 and the plurality of input anatomical images 16 may comprise images from a single image scan or from two different image scans acquired with the same or different image scanners 13, 12.

The system may be incorporated in a medical image acquisition apparatus comprising one or more of the relevant image scanners to acquire the image dataset 4, the anatomical image 17, and/or the plurality of input anatomical images 16. It is possible that the same image scanner can be used to acquire any one or a combination of these kinds of images 4, 9, 16.

The system may also be incorporated in a medical workstation. Such a workstation may be connected to a display device for displaying the output of the visualization subsystem 7.

As mentioned above, an image processing module (not shown) may be present to process the data acquired from the image scanner 13 to obtain the image dataset 4. For example, to obtain an image dataset 4 representing myocardial perfusion, a sequence of images may be acquired by the image scanner 13. Respiratory motion correction may be applied to align the dynamic myocardial perfusion sequence. The myocardial contours may be delineated in the dynamics of the myocardial perfusion sequence. The myocardial perfusion may then be quantified using deconvolution analysis. As will be described hereinafter, a combined anatomical image 9 may be generated from a plurality of input anatomical images 16. In the present example, the sequence of images may be used as the plurality of input anatomical images 16 (so, the image scanners shown as 13 and 12 in the Figure may refer to the same image scanner or to different image scanners). The image combiner 10 may be arranged for calculating a maximum intensity projection (MIP) over time of the aligned images resulting from the respiratory motion correction mentioned above. The gray levels of the MIP may be inverted to improve the visual appearance of the overlay on top of the combined anatomical image. The overlay subsystem 8 may be arranged to overlay the myocardial perfusion processed by the image processing subsystem 3 on top of the combined anatomical image 9.

Figure 4:
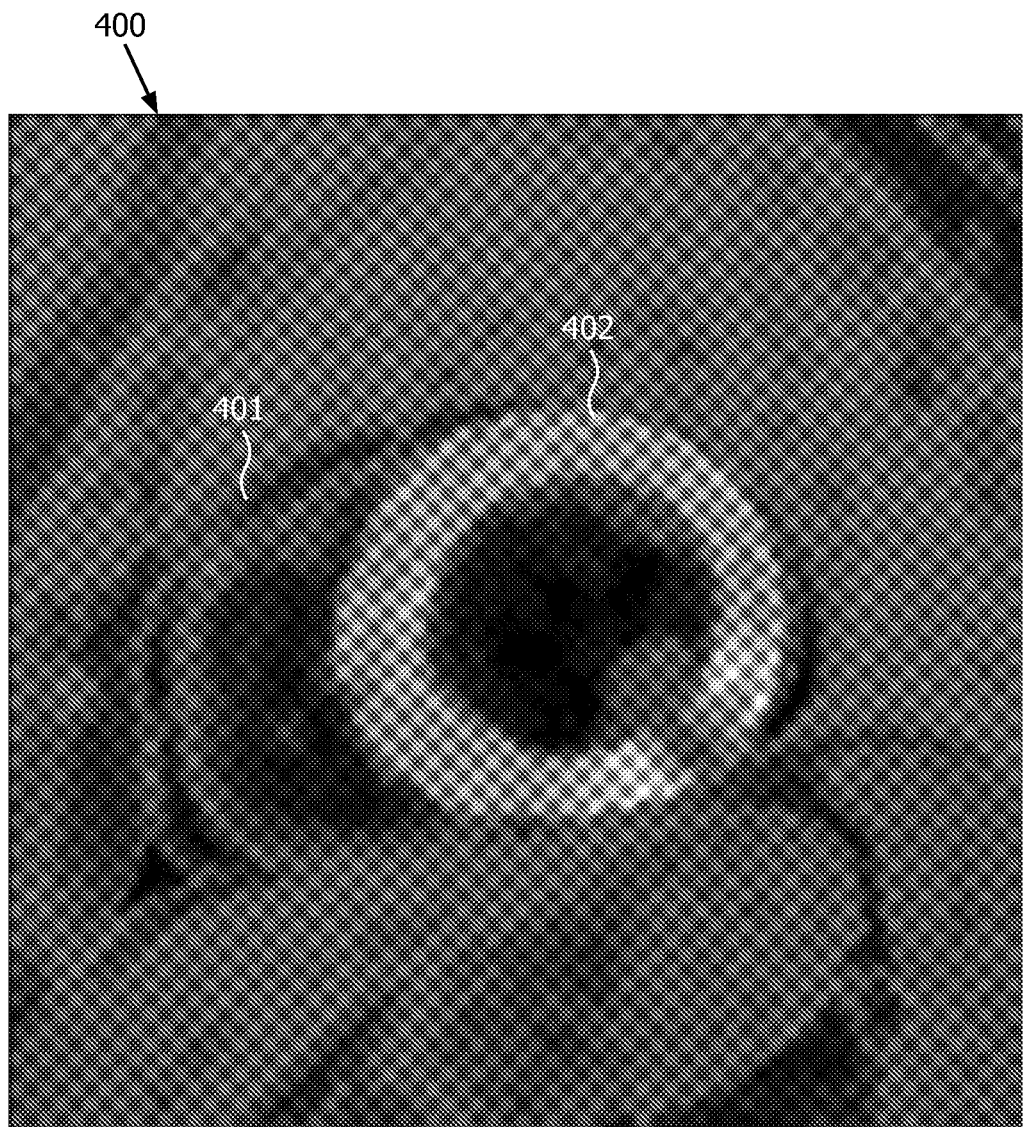
FIG. 4 shows an example image of an anatomical image of a heart with an overlay of functional data.

FIG. 4 illustrates an example visualization 400 of a processed image dataset 5. In this example, the image dataset 4 represents myocardial wall thickening. Such an image dataset 4 may be obtained as follows. The myocardial contours may be delineated in the different phases of a functional cardiac MR series. The wall thickness may be measured in the phases of the functional cardiac MR series. The wall thickening may be calculated based on the wall thickness at end diastole and end systole. The end diastolic cardiac MR image may be used as the anatomical image 9. In this case, the image scanners shown as 17 and 13 in the Figure may actually refer to the same image scanner. The end diastolic cardiac MR image may also be inverted before being used as the anatomical image 9. The wall thickening image dataset 4 may be normalized based on the parameter dataset 1, using the image processing subsystem 3. The resulting processed image dataset 5 may be overlaid on the inverted end diastolic cardiac MR image 9 by the overlay subsystem 8. Accordingly, in FIG. 4, the largest part of the visualization 400 consists of a slice of the inverted end diastolic cardiac MR image 9. The heart wall 401 is visible in the inverted end diastolic cardiac MR image 9. The processed image dataset 5 is visible as overlay 402. The color coding represents myocardial wall thickening. This visualization is an example. Other visualizations, for example perspective renderings, are also possible.

It is also possible to create a sequence of image datasets 4 and a sequence of processed image datasets 5, each dataset relating to a subsequent point in time. Such an image sequence may be visualized by the visualization subsystem 7 as a movie sequence. This is not limited to the example of wall thickening, but may also be performed for other kinds of measurements and image datasets.

It is also possible to acquire the images 11 and/or 9 separately from the image dataset 4, using the same or a different imaging modality, as appropriate.

Figure 2:
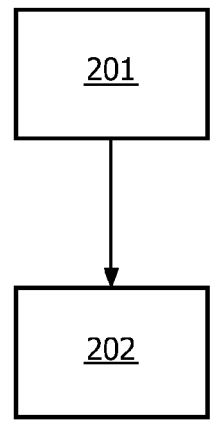
FIG. 2 is a flow chart of a method of generating a processed image dataset.

FIG. 2 illustrates a method of generating a processed image dataset. The method comprises a step 201 of selecting a parameter dataset of a plurality of parameter datasets, wherein a parameter dataset corresponds to a clinically categorized population and represents a transfer function. The method further comprises applying 202 the transfer function represented by the selected parameter dataset to at least part of an image dataset specific for a patient, to obtain a processed image dataset. The method may be implemented by means of a computer program product comprising instructions for causing a processor system to perform the method steps.

Figure 3A:
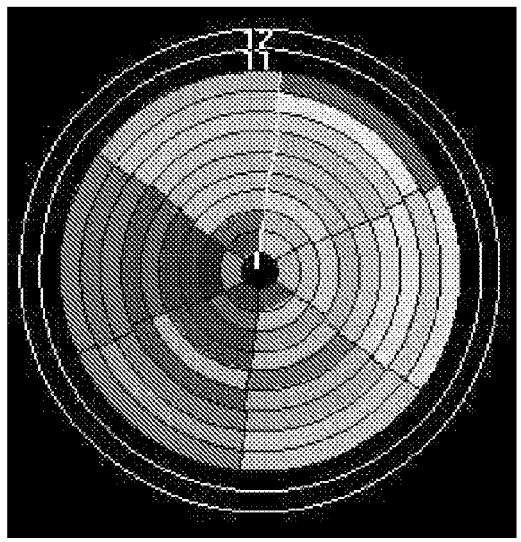
FIG. 3A shows a bull's eye plot having regions with colors representing left ventricular regional wall motion.
Figure 3B:
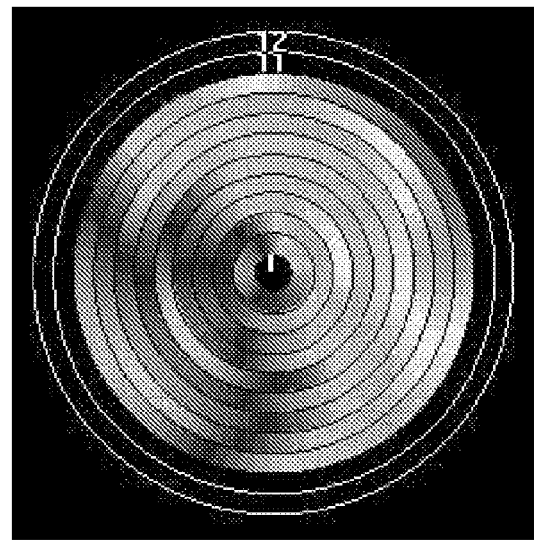
FIG. 3B shows a bull's eye plot without regions with colors representing detailed left ventricular regional wall motion.

FIG. 3A shows an example of a bull's eye plot having regions with colors representing left ventricular regional wall motion. FIG. 3B shows an example of a bull's eye plot with left ventricular detailed wall motion. Although reproduced in the drawing in black and white, such bull's eye plots are usually displayed in color. To correctly interpret these bull's eye plots, the physician would have to compare them with an anatomical image. Moreover, it would be difficult to interpret the colors of the bull's eye plot, because the colors do not relate to normal values in the relevant population to which the patient belongs. The displayed colors may be normalized according to the population, as set forth above. Moreover, the information may be visualized in their anatomical shape, for example as an overlay over an anatomical image.

For example, the system set forth may be used to produce individualized normalized result visualizations, e.g. for myocardial blood flow or myocardial wall thickening. It is possible to color code the information with a clinical implication, indicative of 'normal' or 'potentially healthy', versus 'abnormal' or 'potentially unhealthy', depending on the population. Information about the normal and/or the abnormal values with respect to a population may be represented by the parameter dataset 1.

Contrast MR images may need to be analyzed to produce quantitative results. Such an analysis may comprise several image processing tasks to be completed, including e.g. respiratory motion correction and myocardial contour delineation. For routine use, these tasks can be automated. Obtaining quantitative results from contrast MR images is known by itself. Next, because the acquired images not always clearly show the anatomy, images may be processed, e.g. combined, to enable visualization of the anatomy. Moreover, this visualization may be adapted to facilitate superimposing a color overlay based on the image dataset 4.

The quantitative results obtained from quantitative analysis, and available by means of the image dataset 4, may be overlaid on top of the combined anatomical image that shows the anatomy. The overlay may be color coded such that the colors relate to the severity of an abnormality.

To normalize the color use in the visualization, e.g. let colors relate to the severity of an abnormality, a color look-up table or transfer function may be derived from statistics obtained from a healthy population. In principle, this can be done using a single set of reference values from a large healthy population for all patients. However, it is also possible to use a more individualized normalization, in which the transfer function relates to statistics obtained from a specific population of subjects that are similar to the patient. In this context, similar may refer to having similar characteristics (sex, ethnicity, age, height etc), similar habits (smoking, drinking, occupation, etc), or equivalent disease history (e.g. previous myocardial infarction, resynchronization therapy performed 6 weeks ago, etc.).

By relating the transfer function to a specific population in relation to a specific patient, more individualized visualizations may be obtained (i.e. tailored towards the current patient), as well as more normalized visualizations (i.e. similar colors may indicate a similar degree of abnormality for the majority of measurements and patients).

The techniques disclosed herein may also be of use as an alarm system, attracting the attention of diagnostic radiologists or cardiologist to (potentially) diseased areas.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disk or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or being used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a processed image dataset, comprising:
   a plurality of parameter datasets, wherein a parameter dataset corresponds to a clinically categorized population of patients and represents a transfer function, wherein the parameter dataset includes a statistical distribution of measured characteristics of the clinically categorized population of patients;
   a selector, implemented through a computer hardware processor, for selecting a parameter dataset from the plurality of parameter datasets; and
   an image processing subsystem, implemented through the computer hardware processor, for applying the transfer function represented by the selected parameter dataset to at least part of an image dataset specific for a patient, to obtain a processed image dataset.

2. The system according to claim 1, wherein the selector comprises a user interface element for enabling a user to select the parameter dataset from the plurality of parameter datasets.

3. The system according to claim 1, wherein a parameter dataset is based on a statistical distribution of a population characteristic.

4. The system according to claim 1, wherein the transfer function represented by the parameter dataset arranged for enhancing image values which are less commonly found in the population.

5. The system according to claim 1, further comprising a visualization subsystem for visualizing the processed image dataset.

6. The system according to claim 5, wherein the visualization subsystem comprises an overlay subsystem for overlaying the processed image dataset over an anatomical image.

7. The system according to claim 6, further comprising an image combiner for combining anatomical features represented by any of a plurality of input anatomical images of the patient, to obtain a combined anatomical image, and wherein the overlay subsystem is arranged for overlaying the processed image dataset over the combined anatomical image.

8. The system according to claim 1, wherein the transfer function represents a color coding or an intensity scaling.

9. A medical image acquisition apparatus comprising a system according to claim 7, and further comprising an image scanner for acquiring the image dataset, the anatomical image, or at least one of the input anatomical images, respectively.

10. A medical workstation comprising the system according to claim 5 and a display connected to the visualization subsystem for displaying a visualization of the processed image dataset.

11. The system of claim 1, wherein the parameter dataset includes a mean value and a variance of the measured characteristics of the clinically categorized population of patients.

12. The system of claim 11, wherein the transfer function includes a window width setting and a level setting.

13. The system of claim 12, wherein the window width setting is based on the mean value of the clinically categorized population of patients.

14. The system of claim 13, wherein the level setting is based on the variance of the clinically categorized population of patients.

15. The system of claim 1, wherein the parameter dataset visually enhances image values that are identified to be within a predetermined percentage of the clinically categorized population of patients.

16. The system of claim 15, wherein the parameter dataset assigns a first color or a first intensity to image values common in the clinically categorized population of patients and assigns a second different color to image values not common in the clinically categorized population of patients.

17. The system of claim 1, wherein different parameter datasets include different means and different variances corresponding to the measured characteristics of the different clinically categorized population of patients.

18. The system of claim 1, wherein the parameter dataset includes a color that is normalized to the clinically categorized population of patients.

19. A method of generating a processed image dataset, comprising:
   selecting a parameter dataset of a plurality of parameter datasets, wherein a parameter dataset corresponds to a clinically categorized population of patients and represents a transfer function, wherein the parameter dataset includes a statistical distribution of measured characteristics of the clinically categorized population of patients; and
   applying the transfer function represented by the selected parameter dataset to at least part of an image dataset specific for a patient, to obtain a processed image dataset.

20. A non-transitory computer readable medium comprising instructions for causing a processor system to perform the method according to claim 19.

* * * * *